(12) United States Patent
Kang et al.

(10) Patent No.: US 8,279,195 B2
(45) Date of Patent: Oct. 2, 2012

(54) TOUCH SCREEN PANEL

(75) Inventors: Sung-Ku Kang, Yongin (KR);
Dong-Wook Kang, Yongin (KR);
Chang-Yong Lee, Yongin (KR);
Seong-Je Huang, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 638 days.

(21) Appl. No.: 12/484,792

(22) Filed: Jun. 15, 2009

(65) Prior Publication Data
US 2010/0182249 A1    Jul. 22, 2010

(30) Foreign Application Priority Data

Jan. 16, 2009  (KR) .................. 10-2009-0003630

(51) Int. Cl.
*G06F 3/045* (2006.01)
(52) U.S. Cl. .................. 345/174; 178/18.05; 178/18.06; 178/18.07
(58) Field of Classification Search .......... 345/173–179, 345/204–215; 178/18.01–18.09, 20.01–20.04
See application file for complete search history.

(56) References Cited

U.S. PATENT DOCUMENTS

| | | | |
|---|---|---|---|
| 6,879,096 B1* | 4/2005 | Miyazaki et al. | 313/495 |
| 6,970,160 B2* | 11/2005 | Mulligan et al. | 345/173 |
| 7,339,579 B2 | 3/2008 | Richter et al. | |
| 2006/0097991 A1* | 5/2006 | Hotelling et al. | 345/173 |
| 2008/0264699 A1* | 10/2008 | Chang et al. | 178/18.01 |

FOREIGN PATENT DOCUMENTS

| | | |
|---|---|---|
| KR | 10-2005-0072680 A | 7/2005 |
| KR | 10-2008-0019125 | 3/2008 |
| KR | 10-2008-0043414 | 5/2008 |
| KR | 10-2009-0058070 A | 6/2009 |

OTHER PUBLICATIONS

KIPO Office action dated Jun. 25, 2011 in priority Korean application No. 10-2009-0003630, 1 sht.

* cited by examiner

*Primary Examiner* — Vijay Shankar
(74) *Attorney, Agent, or Firm* — Christie, Parker & Hale, LLP

(57) ABSTRACT

A touch screen panel for an image display device or the like. The touch screen panel includes a transparent substrate; a plurality of first sensing patterns on the transparent substrate; an insulating layer on the first sensing patterns; a plurality of second sensing patterns on the insulating layer; and a plurality of metal patterns on the insulating layer and coupled to the first and second sensing patterns at edge portions of a region in which the first and second sensing patterns are formed. The metal patterns electrically couple the first and second sensing patterns to position detecting lines on the transparent substrate. The touch screen panel further includes first conductive patterns below the metal patterns positioned on edge portions of the insulating layer.

12 Claims, 2 Drawing Sheets

TOUCH SCREEN PANEL

CROSS-REFERENCE TO RELATED APPLICATIONS

This application claims priority to and the benefit of Korean Patent Application No. 10-2009-0003630, filed on Jan. 16, 2009, in the Korean Intellectual Property Office, the entire content of which is incorporated herein by reference.

BACKGROUND OF THE INVENTION

1. Field of the Invention

The present invention relates to a touch screen panel for an image display device or the like.

2. Description of Related Art

A touch screen panel is an input device that allows a user's instruction to be inputted to an image display device or the like by selecting an instruction content displayed on a screen of the image display device with a user's finger or an object.

To this end, a touch screen panel is provided on a front side of an image display device to convert a contact position into an electrical signal. At the contact position, a user's finger or an object is directly in contact with the touch screen panel. Accordingly, an instruction content selected at the contact position is inputted as an input signal to the image display device.

The applications for a touch screen panel have gradually expanded because it can be used to operate an image display device and replace a separate input device (e.g., keyboard or mouse) connected to the image display device.

Touch screen panels are classified into a resistive overlay type touch screen panel, an infrared beam type touch screen panel, a capacitive overlay type touch screen panel, and the like.

Among these touch screen panels, the capacitive overlay type touch screen panel converts a contact position into an electrical signal by sensing a change in capacitance formed between a conductive sensing pattern and another sensing pattern adjacent to the conductive sensing pattern, a ground electrode or the like when a user's finger or an object is in contact with the touch screen panel.

To determine a precise contact position on a contact surface, sensing patterns include first sensing patterns (e.g., X-patterns) formed along a first direction to be connected to each other, and second patterns (e.g., Y-patterns) formed along a second direction to be connected each other.

The first and second sensing patterns are generally formed from the same layer of material. In this case, sensing patterns of the first or second sensing patterns arranged on the same X or Y line or direction are connected by forming separate connection patterns through contact holes formed in an insulating layer formed on the sensing patterns. Therefore, the number of masks utilized during fabrication may be increased, and a fabrication process may be complicated.

In addition, the first and second sensing patterns are connected to position detecting lines by metal patterns at edge portions of regions in which the first and second sensing patterns are formed, respectively.

The metal patterns connect the first and second sensing patterns to the position detecting lines. To improve reliability of the touch screen panel, it is important to maintain the connection state of the metal patterns.

SUMMARY OF THE INVENTION

Accordingly, it is an aspect of embodiments of the present invention to provide a touch screen panel capable of reducing the number of masks utilized during fabrication, simplifying a fabrication process and maintaining the connection state of metal patterns through which sensing patterns are connected to position detecting lines.

According to an embodiment of the present invention, there is provided a touch screen panel including a transparent substrate; a plurality of first sensing patterns on the transparent substrate, the first sensing patterns being coupled to one another along a first direction; an insulating layer on the first sensing patterns; a plurality of second sensing patterns on the insulating layer, the second sensing patterns coupled to one another along a second direction; a plurality of metal patterns on the insulating layer and coupled to the first and second sensing patterns at edge portions of a region in which the first and second sensing patterns are formed, the metal patterns electrically coupling the first and second sensing patterns to position detecting lines on the transparent substrate. The touch screen panel further includes first conductive patterns below the metal patterns and positioned at edge portions of the insulating layer.

The second sensing patterns may be alternately arranged with the first sensing patterns so as not to overlap with the first sensing patterns.

The first conductive patterns may be formed of a same material as that of the second sensing patterns and positioned at a same layer as that of the second sensing patterns.

The first conductive patterns may be between the insulating layer and the metal patterns to be directly in contact with the metal patterns at the edge portions of the insulating layer.

The first conductive patterns may be formed of a transparent electrode material.

The first sensing patterns may include sensing patterns coupled in columns, the sensing patterns of each of the columns having same X-coordinates. The second sensing patterns may include sensing patterns coupled in rows, the sensing patterns of each of the rows having same Y-coordinates. The metal patterns may electrically couple the first and second sensing patterns coupled in the columns and the rows to the corresponding position detecting lines.

The touch screen panel may further include second conductive patterns below the first conductive patterns.

The second conductive patterns may be formed of a same material as that of the first sensing patterns and positioned at a same layer as that of the first sensing patterns.

The second conductive patterns may be formed of indium tin oxide (ITO).

According to another embodiment of the present invention, a touch screen panel includes a transparent substrate, a plurality of first sensing patterns on the transparent substrate, an insulating layer on the first sensing patterns, a plurality of second sensing patterns on the insulating layer, and a plurality of metal patterns on the insulating layer and coupled to the first and second sensing patterns at edge portions of a region in which the first and second sensing patterns are formed. The metal patterns electrically couple the first and second sensing patterns to position detecting lines on the transparent substrate. The touch screen panel further includes first conductive patterns between the metal patterns and edge portions of the insulating layer, wherein the first conductive patterns are electrically coupled to regions of the metal patterns on the edge portions of the insulating layer.

According to the embodiments of the present invention, first sensing patterns coupled to one another along a first direction and second sensing patterns coupled to one another along a second direction are located on different layers, respectively, thereby reducing the number of masks utilized during fabrication and simplifying a fabrication process.

Further, conductive patterns are formed below metal patterns positioned at edge portions of an insulating layer between the first and second sensing patterns.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF EXEMPLARY EMBODIMENTS

Figure 1:
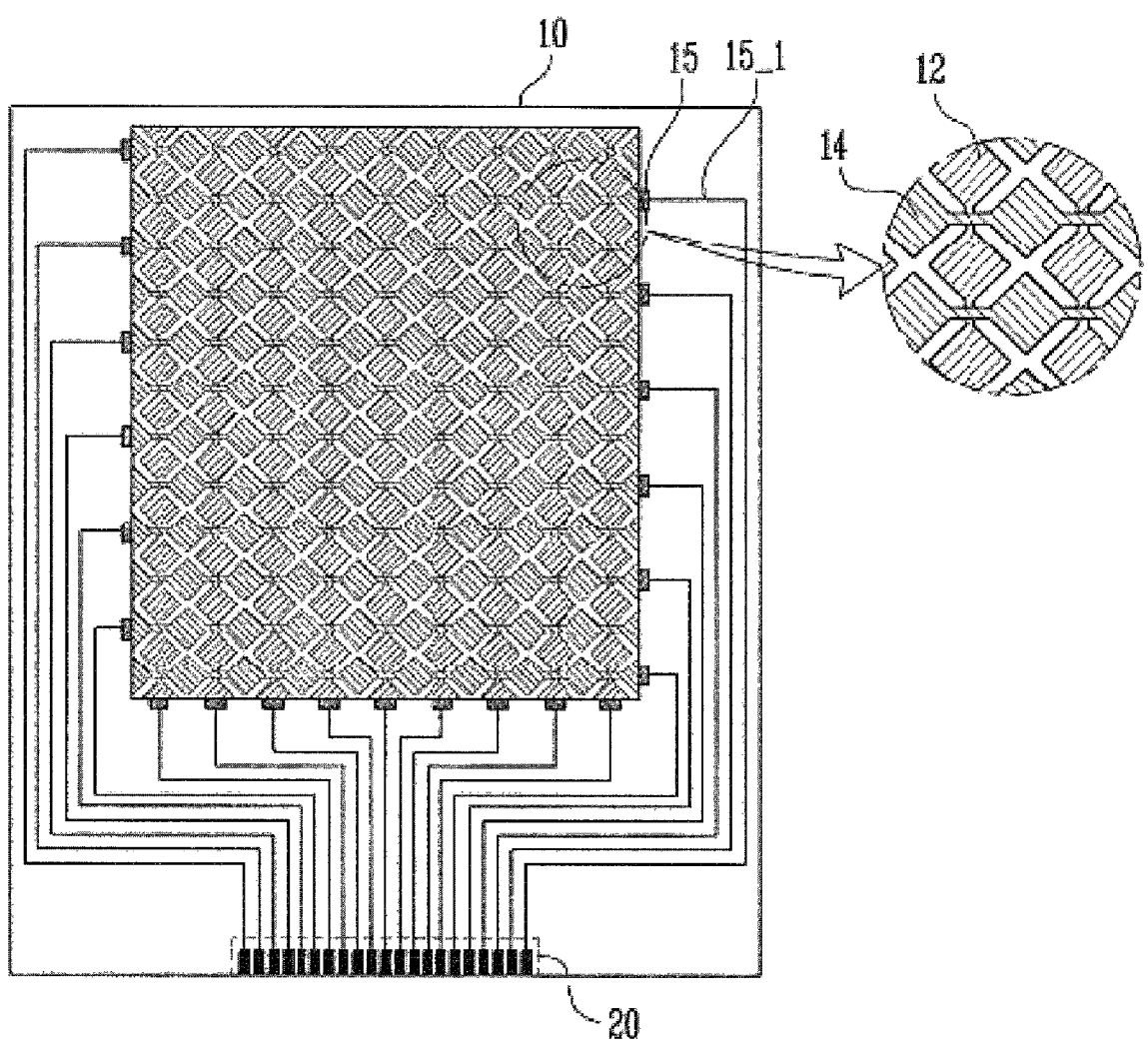
FIG. 1 is a schematic plan view showing a touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to or coupled to the another element or be indirectly connected to or coupled to the another element with one or more intervening elements interposed therebetween. Hereinafter, like reference numerals refer to like elements.

FIG. 1 is a plan view schematically showing a touch screen panel according to an embodiment of the present invention.

Referring to FIG. 1, the touch screen panel according to the embodiment of the present invention includes a plurality of sensing patterns 12 and 14 formed on a transparent substrate 10 and a plurality of metal patterns 15 through which the sensing patterns 12 and 14 are electrically connected to position detecting lines 15_1.

The sensing patterns 12 and 14 are alternately disposed to cross each other. The first sensing patterns 12 with the same X-coordinates are connected to one another in columns, and the second sensing patterns 14 with the same Y-coordinates are connected to one another in rows.

The sensing patterns 12 and 14 are formed close to one another in a regular pattern such as a diamond shape pattern. The pattern of the sensing patterns 12 and 14 is not limited thereto but may be formed in various suitable patterns.

However, in the embodiment of FIG. 1, the first sensing patterns 12 connected along a first direction and the second sensing patterns 14 connected along a second direction crossing with the first direction are disposed with an insulating layer interposed therebetween and positioned on different layers of materials, respectively.

For example, the first sensing patterns 12 may be positioned below the insulating layer, and the second sensing patterns 14 may be positioned above the insulating layer.

The first sensing patterns 12 are formed to be connected along the first direction, e.g., the column direction on the transparent substrate 10. That is, the first sensing patterns 12 may be configured as a plurality of X-patterns so that a plurality of the first sensing patterns 12 positioned on one column with the same X-coordinate are connected to one another.

However, the first sensing patterns 12 are not limited to the X-patterns described above. For example, the first sensing patterns 12 may be configured as a plurality of Y-patterns so that a plurality of first sensing patterns 12 positioned on one row with the same Y-coordinate are connected to one another. However, for the convenience of illustration, it will be assumed hereinbelow that the first and second sensing patterns 12 and 14 are configured as X-patterns and Y-patterns, respectively.

The first sensing patterns 12 connected in columns are connected to position detecting lines 15_1 through metal patterns 15.

The second sensing patterns 14 are formed on the insulating layer that is formed on the first sensing patterns 12, and alternately disposed with the first sensing patterns 12 so as not to overlap with the first sensing patterns 12 except their connecting portions.

Here, the second sensing patterns 14 are formed as connected along the second direction, e.g., the row direction, crossing with the first direction. That is, when the first sensing patterns 12 are configured as X-patterns, the second sensing patterns 14 may be configured as a plurality of Y-patterns so that a plurality of second sensing patterns 14 positioned on one row with the same Y-coordinate are connected to one another.

The second sensing patterns 14 connected in rows are connected to position detecting lines 15_1 through the metal patterns 15.

The metal patterns 15 are connected to the first and second sensing patterns 12 or 14 at edge portions of a region in which the first or second sensing patterns 12 or 14 are positioned, and electrically connect the first or second sensing patterns 12 or 14 to the position detecting lines 15_1.

For example, the metal patterns 15 may connect the first sensing patterns 12 connected in columns and the second sensing patterns 14 connected in rows to be electrically connected to the respective position detecting lines 15_1.

The metal patterns 15 may be formed in contact with the first and second sensing patterns 12 and 14 on the insulating layer interposed between the first and second sensing patterns 12 and 14. In this case, the insulating layer may allow an edge regions of the first sensing patterns 12 connected in columns (or pad units) to be exposed therethrough.

The position detecting lines 15_1 are connected to the respective first and second sensing patterns 12 and 14 through the metal patterns 15 so that the first and second sensing patterns 12 and 14 are connected to a driving circuit. For example, when the touch screen panel is connected to an external driving circuit through a pad unit 20, the position detecting lines 15_1 are connected between the pad unit 20 and the sensing patterns 12 and 14.

Although, it has been described in the above embodiment that the metal patterns 15 and the position detecting lines 15_1 are separated as individual components, however, the present invention is not limited thereto. For example, the metal patterns 15 and the position detecting lines 15_1 may be integrally formed together using the same material in the same process.

The touch screen panel described above is a capacitive overlay type touch screen panel. If a user's finger or a contact object such as a touch stick or stylus is in contact with the touch screen panel, a change in capacitance of the sensing patterns 12 and 14 at the contact position is provided to the driving circuit via the metal patterns 15, position detecting lines 15_1 and the pad unit 20. The change in capacitance is converted to an electric signal by suitable X and Y input processing circuits and the like, thereby detecting the contact position.

In the touch screen panel according to the above described embodiment of the present invention, the first and second sensing patterns 12 and 14 are disposed in different layers, respectively, thereby reducing the number of masks utilized during fabrication and simplifying a fabrication process.

More specifically, if the first and second sensing patterns 12 and 14 are positioned on different layers of materials, respectively, the first and second sensing patterns 12 and 14 can be respectively patterned to be connected to one another along the first and second directions in the patterning process. Accordingly, processes of forming separate contact holes and connecting patterns can be avoided, thereby reducing the number of masks utilized during fabrication and simplifying a fabrication process.

In an embodiment of the present invention, a conductive dummy pattern that stabilizes the connection state of each of the metal patterns 15 is further formed below each of the metal patterns 15. Accordingly, it is possible to prevent or reduce a failure of the touch screen panel caused by a disconnection of the metal patterns 15. More detailed description will be provided later in this specification.

Figure 2:
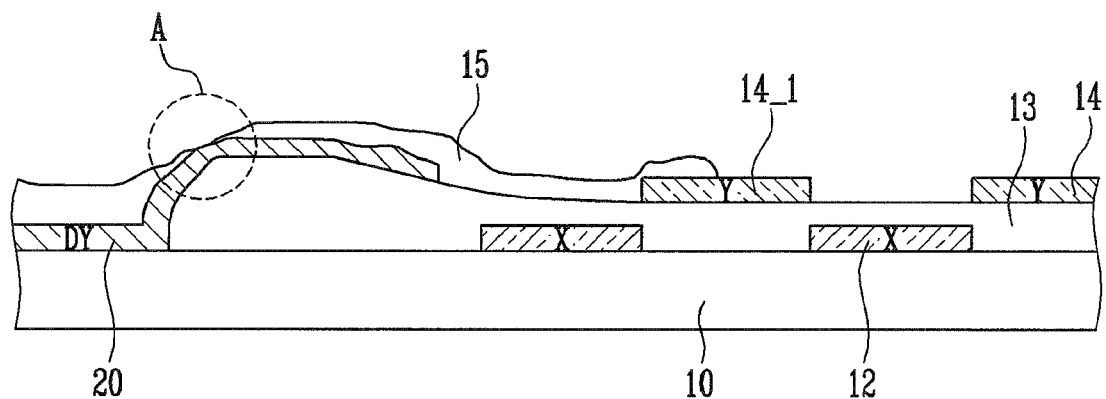
FIG. 2 is a schematic cross-sectional view of a main section of a touch screen panel according to a first embodiment of the present invention.

FIG. 2 is a schematic cross-sectional view of a main section of a touch screen panel according to a first embodiment of the present invention. For the convenience of illustration, a connection portion of a second sensing pattern 14 and a metal pattern 15 is shown in FIG. 2, but a connection portion between sensing patterns is not shown in FIG. 2.

Referring to FIG. 2, the touch screen panel according to the first embodiment of the present invention includes first sensing patterns 12 (X), an insulating layer 13, second sensing patterns 14 (Y) and a metal pattern 15, which are sequentially formed on a transparent substrate 10, and a first conductive dummy pattern 20 (DY) formed below the metal pattern 15.

The transparent substrate 10 may be formed of a material such as glass. However, the transparent substrate 10 may be formed of a transparent substrate material different from the glass. Here, the term "transparency" comprehensively refers to transparency having a suitable high light transmittance, in addition to 100% transparency.

The first sensing patterns 12 are formed on the transparent substrate 10. The first sensing patterns 12 are formed of a transparent electrode material such as indium tin oxide (hereinafter, referred to as ITO) so that light emitted from a display panel disposed below the touch screen panel can be transmitted through the touch screen panel.

The transparent insulating layer 13 is formed on the first sensing patterns 12 so as to cover the first sensing patterns 12. Although not shown in FIG. 2, the insulating layer 13 allows portions of the first sensing patterns 12 to be exposed at edge regions of the first sensing patterns 12 connected in columns, so that the first sensing patterns 12 are connected to respective metal patterns 15.

The second sensing patterns 14 are formed to cross the first sensing patterns 12 on the insulating layer 13. The second sensing patterns 14 are also formed of a transparent electrode material having a suitable high light transmittance, such as ITO.

Each of the metal patterns 15 is formed on an outermost sensing pattern 14_1 of the second sensing patterns 14 connected in rows and the insulating layer 13 at an edge of the region in which the second sensing patterns 14 are formed.

The metal patterns 15 are disposed at edges of the touch screen panel while avoiding a contact surface on which an image is displayed. The metal patterns 15 may be formed of a suitable low-resistance material such as Ag or Mo/Al/Mo.

The metal patterns 15 respectively connect the first and second sensing patterns 12 and 14 to position detecting lines 15_1 so that a change in capacitance on a contact position is provided to a suitable driving circuit. Therefore, the connection state of the metal patterns 15 should be satisfactory to prevent or reduce malfunction of the touch screen panel and to improve reliability of the touch screen panel. That is, to secure the reliability of the touch screen panel, the metal patterns 15 should not be disconnected.

However, the metal patterns 15 may be physically disconnected at an edge portion of the insulating layer 13 having a relatively irregular thickness.

More specifically, when the insulating layer 13 is formed utilizing a printing technique or the like, the edge portion of the insulating layer 13 may be formed thicker than other portions due to the surface tension of a paste and the like.

When steps at the edge portion of the insulating layer 13 are significantly different, the thickness of the metal patterns 15 formed on the edge portion of the insulating layer 13 becomes irregular. Therefore, when the metal patterns 15 are formed, the metal patterns 15 formed at the edge portion of the insulating layer 13 may be disconnected by over-etching or the like as shown in portion A.

If a metal pattern 15 is disconnected, a change in capacitance on a contact position is not provided to the driving circuit even though a contact object is in contact with sensing patterns connected to the disconnected metal pattern 15.

Accordingly, in an embodiment of the present invention, a first conductive dummy pattern 20 is further formed to electrically connect the disconnected metal pattern 15 when the metal pattern 15 is physically disconnected.

The first conductive dummy pattern 20 is formed below each of the metal patterns 15 at least at an edge portion of the insulating layer 13. For example, the first dummy pattern 20 may be interposed between the insulating layer 13 and the metal pattern 15 so as to be directly in contact with each of the metal patterns 15 in at least an edge portion of the insulating layer 13.

Here, to improve processing efficiency, the first conductive dummy pattern 20 may be formed of the same material as that of the second sensing patterns 14 in the process of forming the second sensing patterns 14. For example, when the second sensing patterns 14 are formed of a transparent electrode material such as ITO, the first conductive dummy pattern 20 may also be formed of the same transparent electrode material as that of the second sensing patterns 14. In this case, the first conductive dummy pattern 20 and the second sensing patterns 14 may be positioned in the same layer, i.e., on the first insulating layer 13.

If the first conductive dummy pattern 20 is formed, the electrical conductivity of the metal pattern 15 is maintained through the first conductive dummy pattern 20 even though the metal pattern 15 is physically disconnected at the edge portion of the insulating layer 13.

For the convenience of illustration, only one metal pattern 15 and one first conductive dummy pattern 20 that maintains the electrical conductivity of the metal pattern 15 are shown in FIG. 2. However, a plurality of first conductive dummy patterns 20 may be formed at lower portions of the metal patterns 15 connected to the first and second sensing patterns 12 and 14 connected in columns and rows, respectively.

According to the described embodiment of the present invention, the first conductive dummy patterns 20 are formed at lower portions of the metal patterns 15 positioned on edge portions of the insulating layer 13 interposed between the first and second sensing patterns 12 and 14, thereby maintaining the electrical conductivity of the metal patterns 15. Further, the first conductive dummy patterns 20 may be formed of a transparent electrode material such as ITO, which improves a hydrophilic property, at the lower portions of the metal patterns 15, thereby improving pattern characteristics of the metal patterns 15 and increasing adhesive strength.

In addition, although not shown in FIG. 2, a separate insulating layer may be further formed on the second sensing patterns 14 and the metal patterns 15. A transparent ground electrode and/or another insulating layer covering the transparent ground electrode may be further formed on the other surface of the transparent substrate 10, i.e., the lower surface of the transparent substrate 10.

Figure 3:
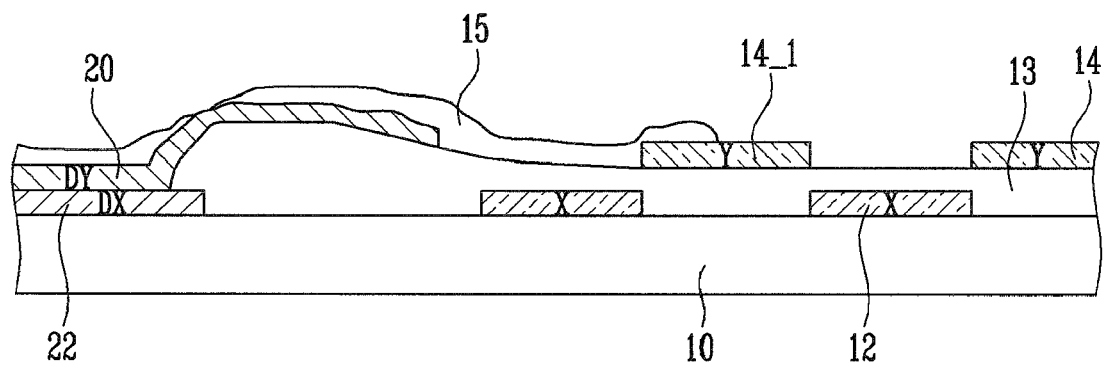
FIG. 3 is a schematic cross-sectional view of a main section of a touch screen panel according to a second embodiment of the present invention.

FIG. 3 is a cross-sectional view of a main section of a touch screen panel according to a second embodiment of the present invention. In FIG. 3, elements like those of FIG. 2 are designated with the like reference numerals, and their detailed descriptions will be omitted.

Referring to FIG. 3, the touch screen panel according to the second embodiment of the present invention further includes a second conductive dummy pattern 22 (DX) formed below a first conductive dummy pattern 20 (DY).

The second dummy pattern 22 may be formed below at least one first conductive dummy pattern 20, e.g., at lower portions of the respective first conductive dummy patterns 20.

Here, to improve processing efficiency, the second conductive dummy pattern 22 may be formed of the same material as that of the first sensing patterns 12 in the process of forming the first sensing patterns 12. For example, when the first sensing patterns 12 are formed of a transparent electrode material such as ITO, the second conductive dummy pattern 22 may also be formed of a transparent electrode material such as ITO.

The second conductive dummy pattern 22 is positioned below the insulating layer 13 in an edge portion of the insulating layer 13. The second conductive dummy pattern 22 may be in contact with the first conductive dummy pattern 20 by extending to a region in which the insulating layer 13 is not formed.

By forming the second conductive dummy pattern, a step difference is reduced between regions in which the first conductive dummy pattern 20 and the metal pattern 15 are formed, respectively. In some embodiments of the present invention, the second conductive dummy pattern and the first sensing patterns 12 may have the same thickness.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
a transparent substrate;
a plurality of first sensing patterns on the transparent substrate, the first sensing patterns coupled to one another along a first direction;
an insulating layer directly on both the first sensing patterns and the transparent substrate, and substantially covering the first sensing patterns;
a plurality of second sensing patterns on the insulating layer, the second sensing patterns coupled to one another along a second direction;
a plurality of metal patterns on the insulating layer and coupled to the first and second sensing patterns at edge portions of a region in which the first and second sensing patterns are formed, the metal patterns electrically coupling the first and second sensing patterns to position detecting lines on the transparent substrate; and
first conductive patterns below the metal patterns and positioned at edge portions of the insulating layer, the first conductive patterns being between the plurality of metal patterns and the transparent substrate.

2. The touch screen panel of claim 1, wherein the second sensing patterns are alternately arranged with the first sensing patterns to not overlap with the first sensing patterns.

3. The touch screen panel of claim 1, wherein the first conductive patterns are formed of a same material as that of the second sensing patterns and positioned at a same layer as that of the second sensing patterns.

4. The touch screen panel of claim 1, wherein the first conductive patterns are between the insulating layer and the metal patterns to be directly in contact with the metal patterns at the edge portions of the insulating layer.

5. The touch screen panel of claim 1, wherein the first conductive patterns are formed of a transparent electrode material.

6. The touch screen panel of claim 5, wherein the first conductive patterns are formed of indium tin oxide.

7. The touch screen panel of claim 1, wherein:
the first sensing patterns comprise sensing patterns coupled in columns, the sensing patterns of each of the columns having same X-coordinates;
the second sensing patterns comprise sensing patterns coupled in rows, the sensing patterns of each of the rows having same Y-coordinates; and
the metal patterns electrically couple the first and second sensing patterns coupled in the columns and the rows to the corresponding position detecting lines.

8. The touch screen panel of claim 1, further comprising second conductive patterns below the first conductive patterns.

9. The touch screen panel of claim 8, wherein the second conductive patterns are formed of a same material as that of the first sensing patterns and positioned at a same layer as that of the first sensing patterns.

10. The touch screen panel of claim 8, wherein the second conductive patterns are folined of indium tin oxide.

11. A touch screen panel comprising:
a transparent substrate;
a plurality of first sensing patterns on the transparent substrate;
an insulating layer directly on both the first sensing patterns and the transparent substrate, and substantially covering the first sensing patterns;
a plurality of second sensing patterns on the insulating layer;

a plurality of metal patterns on the insulating layer and coupled to the first and second sensing patterns at edge portions of a region in which the first and second sensing patterns are formed, the metal patterns electrically coupling the first and second sensing patterns to position detecting lines on the transparent substrate; and first conductive patterns between the metal patterns and edge portions of the insulating layer, the first conductive patterns being between the plurality of metal patterns and the transparent substrate, wherein the first conductive patterns are electrically coupled to regions of the metal patterns at the edge portions of the insulating layer.

12. The touch screen panel of claim 11, further comprising second conductive patterns between the first conductive patterns and the transparent substrate, the second conductive patterns electrically coupled to the first conductive patterns.

* * * * *

UNITED STATES PATENT AND TRADEMARK OFFICE
CERTIFICATE OF CORRECTION

PATENT NO.         : 8,279,195 B2
APPLICATION NO.    : 12/484792
DATED              : October 2, 2012
INVENTOR(S)        : Sung-Ku Kang et al.

It is certified that error appears in the above-identified patent and that said Letters Patent is hereby corrected as shown below:

In the Claims

Column 8, Claim 10, line 51          Delete "folined"
                                     Insert -- formed --

Signed and Sealed this
Fifteenth Day of July, 2014

Michelle K. Lee
*Deputy Director of the United States Patent and Trademark Office*